United States Patent [19]

Mizuno et al.

[11] 4,379,946
[45] Apr. 12, 1983

[54] SIGNALLING SYSTEM AND SIGNAL CONTROL EQUIPMENT FOR MULTI-ADDRESS CALLING

[75] Inventors: Toshiro Mizuno; Kazuo Imai, both of Iruma, Japan

[73] Assignee: Nippon Telegraph & Telephone Public Corporation, Tokyo, Japan

[21] Appl. No.: 265,484

[22] Filed: May 20, 1981

[30] Foreign Application Priority Data

Jun. 5, 1980 [JP] Japan .................................. 55-74930
Feb. 27, 1981 [JP] Japan .................................. 56-27930
Mar. 9, 1981 [JP] Japan .................................. 56-34080

[51] Int. Cl.³ ........................................... H04L 11/15
[52] U.S. Cl. ..................................... 178/3; 340/825.07
[58] Field of Search ...................... 178/3; 370/100, 41, 370/42, 86, 90, 96, 110.1; 340/825.07, 825.52, 825.65

[56] References Cited

U.S. PATENT DOCUMENTS 4,049,906  9/1977  Hafner et al. ..................... 178/3 X
4,335,426  6/1982  Maxwell et al. ................. 370/86 X Primary Examiner—Stafford D. Schreyer
Attorney, Agent, or Firm—Pollock, Vande Sande & Priddy

[57] ABSTRACT

A signalling system for multi-address calling and a signal control equipment therefor in which a control signal starts with a synchronize signal, followed by a function determination field indicating that the control signal is any one of a selection signal, a call accepting state indication signal and a data receiving state indication signal, the function determination field being followed by a terminal appointing field in which the signal, set in the function determination field is provided bit by bit in a predetermined order for each destination terminal. Circuit arrangements for transmitting and receiving such a control signal are provided as signal control equipments both on the side of an originating terminal and on the side of an exchange.

9 Claims, 19 Drawing Figures

FIG. 1
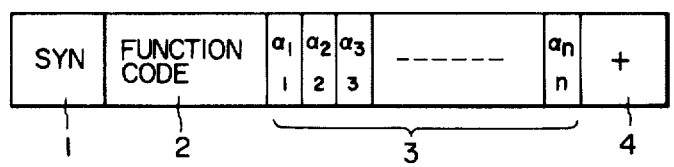
FIG. 2
| CODE | FUNCTION |
|---|---|
| 0 0 0 0 0 0 0 1 | SELECTION SIG: ONE TO ONE COMM |
| 0 0 0 0 0 0 1 0 | SELECTION SIG: MULTI-ADD CALL |
| 0 0 0 0 0 0 1 1 | CALL ACCEPTING STATE SIG |
| 0 0 0 0 0 1 0 0 | PATH CONNECTION REQ SIG |
| 0 0 0 0 0 1 0 1 | DATA RECEIVING STATE SIG |
| 0 0 0 0 0 1 1 0 | CLEAR CONF IND SIG |
FIG. 3
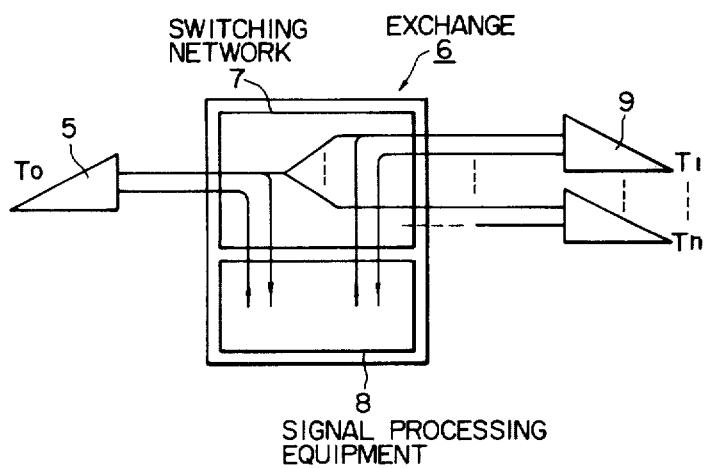

FIG. 9
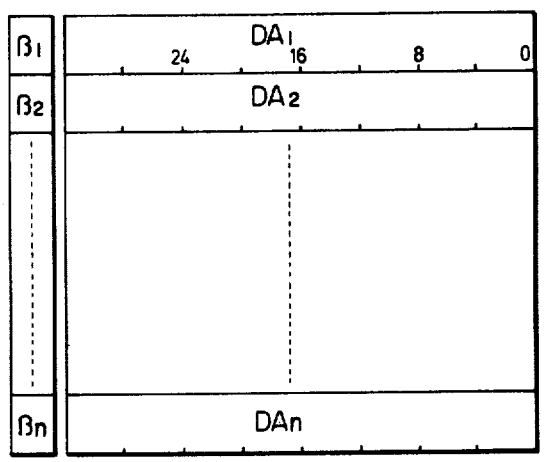
FIG. 12
| INPUT | | | | | | OUTPUT | | | | |
|---|---|---|---|---|---|---|---|---|---|---|
| A5 | A4 | A3 | A2 | A1 | A0 | Q4 | Q3 | Q2 | Q1 | Q0 |
| 1 | 0 | 1 | 1 | 0 | 0 | 0 | 1 | 0 | 0 | 0 |
| 0 | 1 | 1 | 0 | 0 | 0 | 0 | 1 | 0 | 0 | 1 |
| 1 | 1 | 0 | 0 | 0 | 0 | 0 | 1 | 0 | 1 | 0 |
| 1 | 0 | 0 | 0 | 0 | 1 | 0 | 1 | 0 | 1 | 1 |
| 0 | 0 | 0 | 0 | 1 | 0 | 0 | 1 | 1 | 0 | 0 |
| 0 | 0 | 0 | 1 | 0 | 1 | 0 | 1 | 1 | 0 | 1 |
| 0 | 0 | 1 | 0 | 1 | 1 | 0 | 1 | 1 | 1 | 0 |
| 0 | 1 | 0 | 1 | 1 | 0 | 0 | 1 | 1 | 1 | 1 |
| OTHERS | | | | | | 0 | 0 | 1 | 1 | 1 |
SYR — SN
FIG. 13
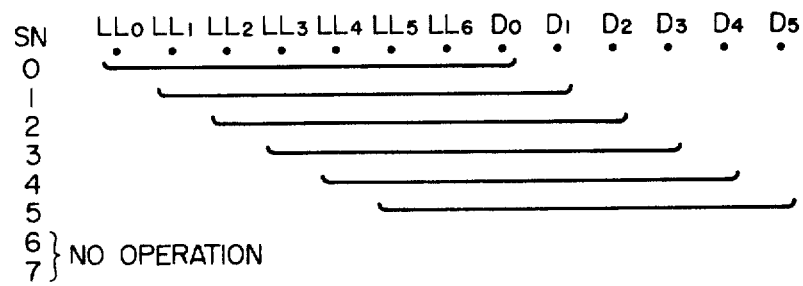

| INPUT | INPUT BIT PTN | | | | | | | | OUTPUT | | |
|---|---|---|---|---|---|---|---|---|---|---|---|
| | A7 | A6 | A5 | A4 | A3 | A2 | A1 | A0 | Q2 | Q1 | Q0 |
| MULTI-ADD SEL | 0 | 0 | 0 | 0 | 0 | 0 | 1 | 0 | 1 | 0 | 0 |
| SYN | 0 | 0 | 0 | 1 | 0 | 1 | 1 | 0 | 0 | 0 | 1 |
| + | 1 | 0 | 1 | 0 | 1 | 0 | 1 | 1 | 0 | 1 | 0 |
| PATH CON | 0 | 0 | 0 | 0 | 0 | 1 | 0 | 0 | 1 | 0 | 0 |
| OTHERS | | | | | | | | | 0 | 0 | 0 |

| INPUT | | | | | | | | | OUTPUT | | | | | | | |
|---|---|---|---|---|---|---|---|---|---|---|---|---|---|---|---|---|
| A8 | A7 | A6 | A5 | A4 | A3 | A2 | A1 | A0 | Q7 | Q6 | Q5 | Q4 | Q3 | Q2 | Q1 | Q0 |
| * | 0 | 0 | 1 | * | * | SN | | | 0 | 0 | 0 | SN+2 | | | 1 | 1 |
| * | * | * | * | φ1 | φ0 | SN (6or7) | | | 0 | 0 | 0 | (SN+2)mod8 | | | φ1 | φ0 |
| * | * | * | 0 | * | 0 | SN | | | 0 | 0 | 0 | SN+2 | | | 0 | 0 |
| * | * | * | 0 | 0 | 1 | SN | | | 0 | 0 | 0 | SN+2 | | | 1 | 0 |
| 0 | 1 | 0 | 0 | 1 | 1 | SN | | | 1 | 0 | 0 | SN+2 | | | 1 | 1 |
| 1 | 1 | 0 | 0 | 1 | 1 | SN | | | 0 | 0 | 0 | SN+2 | | | 1 | 1 |
| * | 0 | 1 | 0 | 1 | 1 | SN | | | 0 | 1 | 0 | SN+2 | | | 0 | 0 |
| 0 | 0 | 0 | 0 | 1 | 1 | SN | | | 0 | 0 | 1 | SN+2 | | | 1 | 1 |

MD ML + SYN  SYR  SN  Ⓕ Ⓖ Ⓛ  SN  SYR

SIGNALLING SYSTEM AND SIGNAL CONTROL EQUIPMENT FOR MULTI-ADDRESS CALLING

BACKGROUND OF THE INVENTION

The present invention relates to multi-address calling for transmitting the same information from an originating terminal to a plurality of destination terminals, and more particularly to a signalling system for a control signal related to the plurality of destination terminals, which is transmitted and received between the originating terminal and an exchange in such multi-address calling and a signal control equipment therefor which generates and receives the control signal and performs call control.

There have heretofore been proposed for multi-address calling (1) a sequential multi-address delivering system in which each destination terminal address and communication data are once stored in a terminal control equipment of an originating terminal, and paths are then connected to the destination terminals one after another to transmit thereto the communication data; (2) a stored data multi-address delivering system in which destination terminal addresses and communication data are stored in an exchange from an originating terminal and then the exchange connects the destination terminals one after another and transfers thereto the communication data upon each connection; and (3) a real time multi-address calling system in which an originating terminal is simultaneously connected to all of destination terminals to transmit communication data from the former to the latter at the same time.

For achieving these multi-address communication systems, use has been made of such signalling systems and control systems as follows: In an ordinary dialing system, each destination terminal address is dialed as by a ten-key keyboard for transmission; accordingly, in this system, it is necessary to successively dial many ordinary dial signals consisting of a plurality of figures, resulting in the operation becoming very troublesome. Further, this system requires processing for receiving and translating a plurality of dials in the exchange and the dial signal becomes long, and hence the transfer time therefor becomes long. In the case of (1) the sequential multi-address delivering system, it is necessary to employ a storage for storing the destination terminal address in the terminal control equipment. There has been proposed a push-button operating system in which a plurality of push buttons on a control panel have one-to-one correspondence to a plurality of destination terminals and are selectively depressed to generate the address of the destination terminal corresponding to the depressed push-button. In this case, it is necessary that information for the correspondence between the push-buttons and the destination terminals be held in the terminal control equipment and the address transmission control is complex and calls for expensive equipment; furthermore, it is necessary to receive and translate a plurality of addresses in the exchange and the transfer time is long. In a general or group multi-address calling system, destination terminals of general or group multi-address calling are connected to an exchange in advance and a signal of general or group multi-address calling is transmitted from an originating terminal. In this system, the signal is transmitted to all terminals or all terminals of the group and it is impossible to select at will the destination terminals call by call. Moreover, any of the above systems do not have a function of transmitting to the originating terminal information about a call from each destination terminal.

Japanese Patent Kokai (Laid-Open) Gazette No. 65711/74 (June 26, 1974) discloses the following signalling system. From an originating terminal are sent out N bits, which have one-to-one correspondence to destination terminals, and those of the N bits corresponding to the destination terminals desired to call are set, for example, to "1" and the bits corresponding to the other destination terminals are set to "0". When receiving a selection signal of the N bits, an exchange switches its contacts for the destination terminals corresponding to the bits "1", thereby to call the destination terminals. The exchange informs the originating terminal of the call accepting state of each called destination terminals by a call accepting state signal of N bits which are each set, for example, to "1" or "0" depending upon whether the corresponding called destination terminal is call-accept or non-call-accept and which are arranged in the same order of the destination terminals as the abovesaid N-bit selection signal. The originating terminal detects the status "1" or "0" of each bit of the N-bit call accepting state signal to learn whether or not the called terminals have accepted the call. Such a signalling system markedly simplifies the operation in the originating terminal, reduces the operating time, does not require storing the destination terminal addresses in an originating terminal control equipment and permits real time multi-address calling to selected ones of the destination terminals. Further, this system is very convenient since the exchange transmits to the originating terminal the call accepting state signal in the form of an N-bit signal similar to the N-bit call request signal.

But the primary object of prior this system resides in that after receiving the call accepting state signal, the originating terminal sends out communication data only to the call-accept destination terminals and then automatically calls again the non-call-accept destination terminals at the calling party's request. To perform this, the system employs means for storing and indicating the called terminals, means for storing and indicating the call accepting state of each destination terminal based on the call accepting state signal, means for retaining the memory of the non-call-accept ones of the terminals appointed to call and removing the memory of the other terminals by the sending out of the communication data, and means for calling again the non-call-accept destination terminals based on their memory retained in the abovesaid means. But the gazette makes no mention of how the N-bit selection signal and the N-bit call accepting state signal are produced and delivered. Furthermore, in the exchange is provided a special switch for selecting either a switching network or a trunk for multi-address calling; in the multi-address calling, the switch is changed over to the side of the trunk, by which the communication data transfer is performed without passing through the switching network, that is, use is made of a connection different from an ordinary one. Accordingly, it is difficult for all terminals accommodated in the exchange to be used as destination terminals of the multi-address calling.

Moreover, this prior signalling system possesses the afore-mentioned features but information from the exchange to the originating terminal is limited specifically to the call accepting state signal. For example, in the case of sending facsimile data by one-to-one communication, the originating terminal makes a telephone call to the destination terminal to confirm that the facsimile data is surely received by the destination terminal. Such confirmation is important but has not been practised in the past since it is very troublesome because of a large number of destination terminals in the multi-address calling.

It is an object of the present invention to provide a signalling system for multi-address calling by which various signals related to a plurality of destination terminals, which are transmitted and received between an originating terminal and an exchange, can be delivered with small amounts of data, in a standardized, simple format and in a short time.

Another object of the present invention is to provide a signalling system for multi-address calling by which a plurality of destination terminals can be called easily and in a short time and not only the call accepting state but also the data receiving state of each destination terminal can be transmitted by control signals of a standardized format from an exchange to an originating terminal.

Another object of the present invention is to provide a signal control equipment for multi-address calling with which a control signal related to a plurality of destination terminals, transmitted from an exchange, are detected and indicated in an originating terminal for each destination terminal.

Another object of the present invention is to provide a signal control equipment for multi-address calling in which the burden on a central processing unit on the side of an exchange is relatively light and the processing time for a control signal is short.

Still another object of the present invention is to provide a signal control equipment for multi-address calling with which an originating terminal can be connected by an exchange to a destination terminal in the same manner as an ordinary connection, and accordingly desired ones of destination terminals registered in the exchange in advance can be used as destination terminals of the multi-address calling.

SUMMARY OF THE INVENTION

According to the present invention, a control signal related to a plurality of destination terminals, which is transmitted and received between an originating terminal and an exchange, is composed of a synchronize signal, a function determination field and a terminal appointing field. The synchronize signal is information for detecting the beginning of the control signal on the receiving side. The function determination field is information for indicating that the control signal is any one of at least a destination terminal selection signal, a call accepting state indication signal of the destination terminals and a data receiving state indication signal of the destination terminals. The terminal appointing field is information which is composed of n bits (n being an integer larger than 1) and the bits have one-to-one correspondence to the destination terminals and each bit indicates a signal indicated by the function determination information for the destination terminal corresponding to the bit. For example, in the case where the function determination information is the destination terminal selection signal, each bit of the terminal appointing information indicates whether the corresponding destination terminal is selected or not. In the case where the function determination information is the call accepting state indicating signal, each bit of the terminal appointing information indicates the call accepting state of the corresponding destination terminal as to whether it has accepted a call or not. When the function determination information is the data receiving state indicating signal, each bit of the terminal appointing information indicates whether the corresponding destination terminal is receiving data or not.

Such a control signal is employed and, in any kinds of such control signals, only one bit is allotted to each destination terminal; accordingly, the control signals are small in the amount of information and their producing and sending out operations are simple and can be achieved in a short time. In addition, the presence of the function determination information makes it possible that various control signals, in particular, a plurality of kinds of control signals related to the destination terminals, which are transmitted from the exchange to the originating terminal, are transmitted in a standardized signal format and by correlating only one bit to each destination terminal. Accordingly, the data receiving state of each destination terminal can easily be confirmed in the multi-address communication, too.

A signal control equipment for multi-address calling, which is provided in the originating terminal, is arranged so that a transmitting circuit sequentially sends out, bit by bit, to the exchange the synchronize signal, the function determination information and the terminal appointing information from a synchronize signal generator, a function determination information holding circuit for determining the kind of control information and a terminal appointing information holding circuit for appointing the plurality of destination terminals by bit information having one-to-one correspondence thereto, respectively. The function determination information is set as by a ten-key keyboard in the function determination information holding circuit and each bit of the terminal appointing information is appointed in the terminal appointing information holding circuit by means of a push button corresponding to each destination terminal. In the receiving circuit, the synchronize signal is detected by a synchronize signal detection circuit from the control signal transmitted from the exchange, and the function determination information and the terminal appointing information following the synchronize signal are sequentially distributed to the respective holding circuits wherein they are held. The function determination information held in the function determination information holding circuit is displayed on a display and the status of each bit of the terminal appointing information is indicated by an indicating element provided corresponding to each of the destination terminals. Since the bits of the received terminal appointing information are thus indicated, as they are, by the corresponding indicating elements, there is no need of, for example, decoding the received information prior to its indication.

In a signal control equipment for multi-addressing, which is provided on the side of the exchange, a destination terminal address table having terminal bit appointing storage areas respectively corresponding to the bits of the terminal appointing information in the control signal is provided for each originating terminal. The destination terminal address table has preset and prestored therein destination terminal addresses at its terminal appointing bits corresponding thereto. Upon reception of the control signal, the bits of the received terminal appointing information are respectively written in the bits of the terminal bit appointing storage areas of the destination terminal address table corresponding to the originating terminal having sent out the control signal. Then, the central processing unit sequentially reads out the contents of this destination terminal address table. When the terminal appointing bit is, for example, "1", the central processing unit learns that the originating terminal is requesting a call to the destination terminal corresponding to the terminal appointing bit and learns the address of the appointed destination terminal from the destination terminal address read out at that time. Thereafter, the central processing unit can set a call request for each destination terminal in the same manner as in the prior art. Since it is sufficient for the central processing unit to merely read out the destination terminal address table corresponding to each originating terminal as described above, the burden on the central processing unit is light and call processing is performed in the same manner as the ordinary connection and multi-address calling can be made to desired ones of the destination terminals.

BRIEF DESCRIPTION OF THE DRAWINGS

FIG. 1 is a diagram showing an example of the format of a control signal for use in the present invention;

FIG. 2 is a diagram showing the relationships between codes of function determination information and the kinds of signals;

FIG. 3 is a block diagram showing the outline of a multi-address calling system;

FIG. 9 is a diagram showing an example of an address transformation table;

FIG. 12 is a diagram showing the input/output logic of a synchronous detection circuit 207 in FIG. 11;

FIG. 13 is a diagram showing the relationships between shift numbers as control signals and output bits in a parallel shifter 211 in FIG. 11;

DESCRIPTION OF THE PREFERRED EMBODIMENTS

Figure 4:
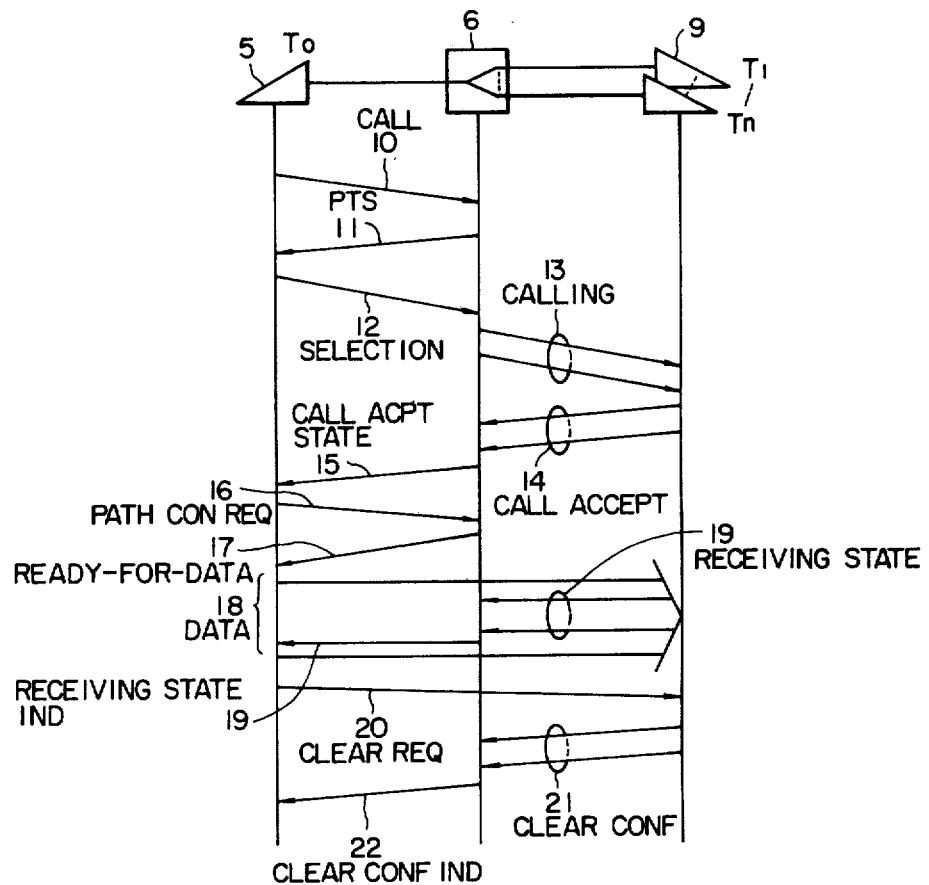
FIG. 4 is a diagram showing the connecting sequence of the multi-address calling.

FIG. 1 illustrates an example of the format of a control signal for the multi-address calling according to the present invention. The control signal is transmitted and received between an originating terminal and an exchange; in the present invention, such a control signal format as shown in FIG. 1 is used for various signals which are related to a plurality of called or destination terminals. The control signal is composed of a synchronize signal 1, a function determination field or information 2, a terminal appointing field or information 3 and an end signal 4. The synchronize signal 1 indicates the beginning of the control signal. The function determination field 2 sets therein a code representing any one of a selection signal, a call accepting state indication signal, a path connecting request signal, a data receiving state indication signal and a clear confirmation indication signal; furthermore, in the case of the selection signal being set, the function determination field 2 indicates whether the calling is a one-to-one or multi-address calling, too.

The terminal appointing field 3 is used to allot the signal set in the function determination field 2, as an ordinary character dial, to one destination terminal in the case of the one-to-one calling or, as one bit, to each destination terminal in the case of the multi-address calling. That is, 1 when the code or information representing the selection signal and the one-to-one calling is set in the function determination field 2, the terminal appointing field 3 indicates one destination terminal number as an ordinary character dial. This setting is effected in the originating terminal. 2 When the code or information representing the selection signal and the multi-address calling is set in the function determination field 2, the terminal appointing field 3 indicates destination terminals to be called. In other words, the terminal appointing field 3 has a plurality of bit positions 1 ... n and each bit position j (j=1 ... n) is correlated to each destination terminal in advance; for example, by setting to "1" the value $a_j$ of the bit position j of the destination terminal to be called, a selection signal indicating the selection of that destination terminal is provided thereto and the value $a_j$ of the bit position of an unselected destination terminal is set to "0". This setting is done at the originating terminal.

3 When the code or information representing the call accepting state indication signal is set in the function determination field 2, the terminal appointing field 3 indicates the call accepting state of a plurality of destination terminals to be called. In this case, the value $a_j$ of the bit position j corresponding to each destination terminal is set to "1" or "0" depending on whether the terminal is in a data receivable or unreceivable state, as is the case with 2. This setting is effected in the exchange. 4 When the code or information representing the path connecting request signal is set in the function determination field 2, the terminal appointing field 3 indicates the destination terminals which are actually decided to receive multi-address communication data. As in the case of 2, the value $a_j$ of the bit position j corresponding to each terminal in the terminal appointing field 3 is set to "1" or "0" depending on whether the path to the terminal is connected or not. This setting is performed in the originating terminal.

5 When the code or information representing the data receiving state indication signal is set in the function determination field 2, the terminal appointing field 3 indicates the data receiving state of a plurality of destination terminals which are in the multi-address communication state. Also, in this case, the value $a_j$ of the bit position j corresponding to each terminal is set to "1" or "0" depending on whether the receiving state of the destination terminal is good or not. This setting is effected in the exchange. 6 When the code or information representing the clear confirmation indication signal is set in the function determination field 2, the terminal appointing field 3 indicates the destination terminals which have sent out a clear confirmation signals. In this case, too, the value $a_j$ of the bit position j corresponding to each terminal in the terminal appointing field 3 is set to "1" or "0" depending on whether the terminal has been cleared or not. This setting is performed in the exchange. FIG. 2 shows an example of the correspondence between the functions and the codes which are set in the function determination field 2.

FIG. 3 illustrates the connections between the terminals and the exchange in the multi-address communication system. In FIG. 3, an originating terminal 5 ($T_o$) is connected to an exchange 6, which has a switching network 7 and a signal processing equipment 8. In accordance with the control signal from the originating terminal 5, the exchange 6 connects therethrough the originating terminal 5 to a plurality of terminals 9 ($T_1$ to $T_n$, where $n \geq 2$) which are destination terminals of the multi-address calling.

FIG. 4 shows an example of the connection sequence between the originating terminal 5 and the called terminals 9 in the case of using the control signal according to the present invention. Signals which are transmitted and received between the terminals 5 and 9 and the exchange 6 are a call request signal 10, a proceed-to-select signal 11, a selection signal 12, a calling signal 13 to each called terminal, a call accept signal 14 from each called terminal, a call accepting state indication signal 15, a path connection request signal 16, a ready-for-data signal 17, communication data 18, a data receiving state indication signal 19 which is sent out from each called terminal during data reception and arranged by the exchange 6, a clear request signal 20, a clear confirmation signal 21 from each called terminal and a clear confirmation indication signal 22.

A description will be given of the communication procedure. In this example, the signalling system between the terminals and the exchange accords with the interface condition in a synchronous public data network (CCITT Recommendation X.2) and the signal is represented in the form of a bit group composed of one status bit (S bit) and a plurality of data bits. The signal will hereinafter be represented by (data; S bit) and the status of the S bit by ON and OFF. When the originating terminal 5 requests a call, the call request signal 10 is sent out to the exchange 6. Upon detection of the call request signal 10, the exchange 6 sends back the proceed-to-select signal 11 (SYN, SYN, repetition of +; OFF) to the originating terminal 5. Upon reception of the proceed-to-select signal 11, the originating terminal 5 sends out the selection signal 12 in the signal format shown in FIG. 1. For example, in the case where terminals $T_1$ to $T_n$ have already been registered as possible destination terminals of the multi-address calling by the originating terminal 5 in the exchange 6 the first, second, ... nth bits in the terminal appointing field 3 of the signal format depicted in FIG. 1 are predetermined to correspond to the destination terminals $T_1, T_2, \ldots T_n$, if the multi-address calling is directed to the destination terminals $T_1$ and $T_2$, then the selection signal 12 (SYN, SYN, 00000010, 110 ... 0, +; ON) is delivered. In the selection signal 12, 00000010 is the function determination information 2, which indicates the selection signal of the multi-address calling, as will be seen from the code table of FIG. 2. And 110 ... 0 after the function determination information indicates the selection of the terminals $T_1$ and $T_2$.

Having received the selection signal 12, the exchange 6 analyzes the signal and detects that it is the multi-address calling and then sends out the calling signal 13 to the terminals $T_1$ and $T_2$. If the terminals $T_1$ and $T_2$ are in their data receivable state, then they each send back a call accept signal 14 (1; ON) to the exchange 6; if they are in their data unreceivable state, then they each send back a signal (0; OFF) or (repetition of 01; OFF) to the exchange 6. In accordance with the signal sent back from each of the terminals $T_1$ and $T_2$, the exchange 6 sets the call accepting state signal 15 in the function determination field 2 of the signal format depicted in FIG. 1 and provides to the originating terminal 5 the signal in which the call accepting state of each destination terminal 9 is indicated by "0" or "1" at the corresponding bit position of the terminal appointing field 3. For example, when the terminals $T_1$ and $T_2$ are both in the data receivable state, the exchange 6 provides the call accepting state indication signal 15 (SYN, SYN, 00000011, 110 ... 0, +; OFF) to the originating terminal 5. Having detected the call accepting state of each destination terminal from the call accepting state indication signal, the originating terminal 5 sends out the path connecting request signal 16. The exchange 6 connects paths only to the destination terminals specified by the signal 16; namely, the exchange 6 connects the paths between the originating terminal 5 and the respective destination terminals 9, permitting communication to the destination terminals 9 in the data receivable state. When multi-address delivering paths have thus been set up, the exchange 6 sends back the ready-for-data signal 17 (1; ON) to the originating terminal 5. In response to the ready-for-data signal 17, the originating terminal 5 starts sending the communication data 18 to the destination terminals $T_1$ and $T_2$.

In this communication phase, the destination terminals $T_1$ and $T_2$ inform the exchange 6 of their data receiving state, for example, using a specified bit pattern (repetition of "01"; ON). This signal is monitored by the exchange 6 and, based on the result of the monitoring, the code "00000101" representing the data receiving state indication signal is set in the function determination field 2 of the signal format shown in FIG. 1 and the bit positions in the terminal appointing field 3, respectively corresponding to the destination terminals, are each set to "1" or "0", whereby to inform the originating terminal 5 of whether the data receiving state of the called terminals is good or not.

When it is desired to clear the paths, the originating terminal 5 applies the clear request signal 20 (0: OFF) to the called terminals 9. When each called terminal 9 sends back the clear confirmation signal 21 (0; OFF) in response to the clear request signal 20, the exchange 6 detects the signal 21 and sets the code 00000110 representing the clear confirmation indication signal in the function determination field 2 of the signal format of FIG. 1 and sets "1" in the terminal appoint field 3 at the bit positions corresponding to the called terminals having sent out the clear confirmation signal 21, thereby informing the originating terminal 5 of the clear confirmation state of each called terminal.

Figure 5:
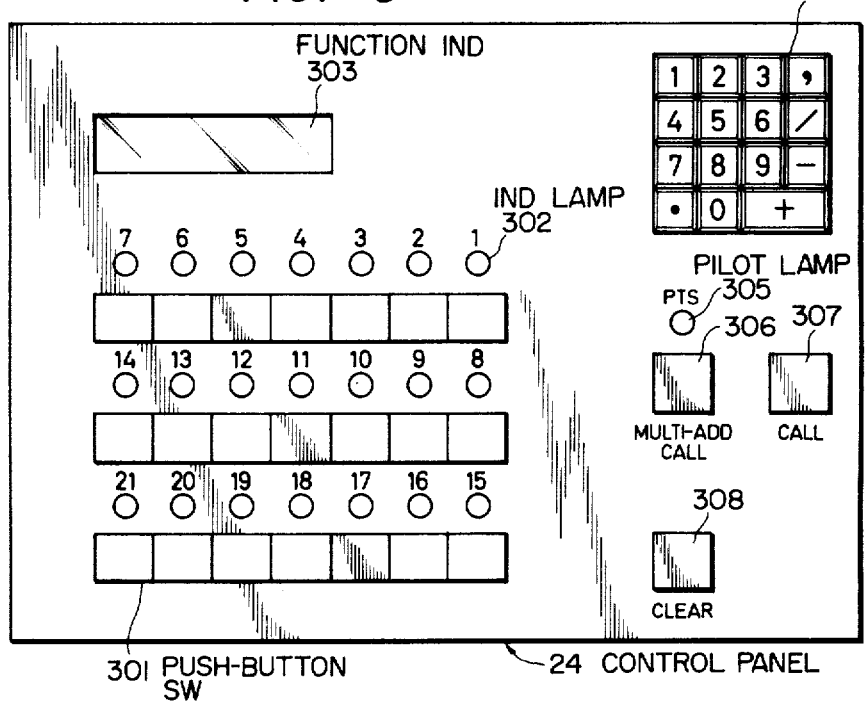
FIG. 5 is a schematic diagram illustrating an example of a control panel of a multi-address calling signal control equipment on the side of an originating terminal.

FIG. 5 illustrates an embodiment of a control panel of a multi-address delivering signal control equipment provided on the side of the originating terminal. On the control panel are provided pairs of destination terminal appointing push-button switches 301 and destination terminal indicator lamps 302 and the number of the pairs is selected to be at least larger than the number of destination terminals registered in the exchange; in this embodiment, 21 pairs of the switches 301 and the lamps 302 are disposed on the control panel and they have one-to-one correspondence to the destination terminals. The push-buttons 301 are each turned ON to appoint the corresponding destination terminal and the indicator lamps 302 are lighted when appointed by the terminal appointing information 3 of the control signal received from the exchange. A function indicator 303 indicates the kind and content of the signal received from the exchange and a ten-key keyboard 304 is used to designate the kind of signal to the exchange and to dial during a general call connection. Further, there are provided on the control panel a pilot lamp 305 indicating the reception of the proceed-to-select signal or acknowledgement from the exchange, a push-button switch 306 for indicating the transmission of multi-address communication data, a push-button switch 307 for transmitting the call request signal and a push-button switch 308 for transmitting the clear request signal. By turning ON the respective switches, the corresponding signals are transmitted.

Figure 6:
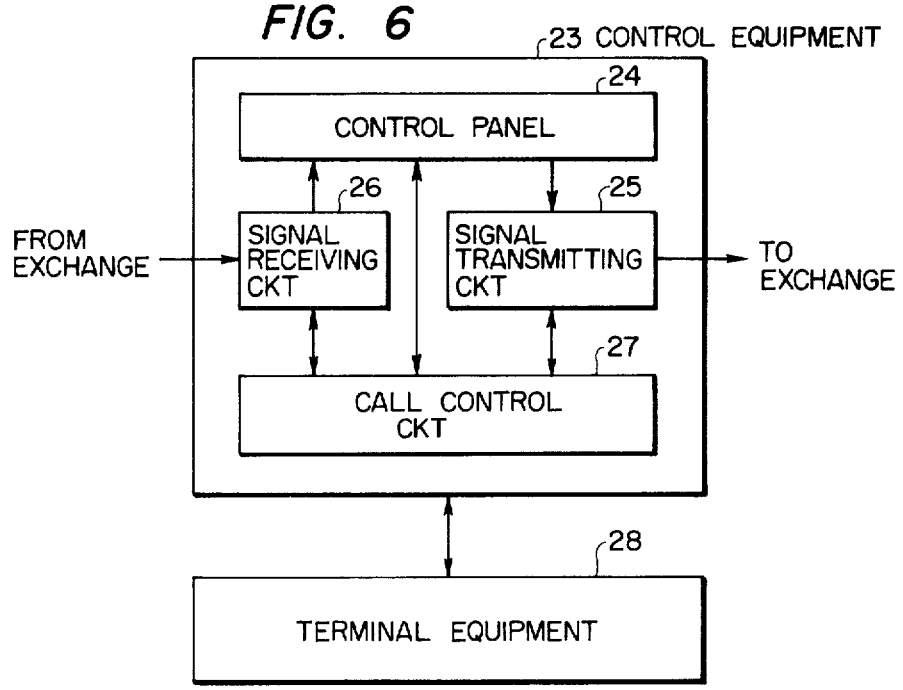
FIG. 6 is a block diagram illustrating the construction of the multi-address calling signal control equipment on the side of the originating terminal.

FIG. 6 shows an embodiment of the multi-address delivering signal control equipment provided at the originating terminal. The control equipment, indicated generally 23, comprises the control panel 24 depicted in FIG. 5, a multi-address communication signal transmitting circuit 25, a multi-address communication signal receiving circuit 26 and a call control circuit 27. The control equipment 23 is connected to a terminal equipment 28. The control equipment 23 is operative to perform between it and the exchange, control for the communication of the terminal equipment 28 with other terminals and, in the multi-address delivering, the control equipment 23 transmits and receives signals in accordance with a connection sequence such as shown in FIG. 4.

The call request signal 10 produced by depressing the push-button switch 307, the selection signal 12 set by the ten-key keyboard 304 and the push-button switch 301 on the control panel 24, the patch connecting request signal 16, the communication data 18 and the clear request signal 20 are all transmitted via the transmitting circuit 25. The proceed-to-select signal 11, the call accepting state indication signal 15, the cut-through signal 17, the data receiving state indication signal 19 and the clear confirmation indication signal 22 from the exchange 6 are all received by the receiving circuit 26. When the proceed-to-select signal 11 is received, the proceed-to-select indication lamp 305 is turned ON.

The receiving circuit 26 receives the call accepting state indication signal 15, the data receiving state indication signal 19 and the clear confirmation signal 22 which are transmitted from the exchange 6 and displays the received function determination information 2 on the function indicator 303 of the control panel 24 and each bit of the received terminal appointing field 3 on the corresponding indicating lamp 302. The call control circuit 27, in the case of the multi-address calling, transmits and receives, in accordance with the connection sequence of FIG. 4, control signals except the multi-address calling control signal of the signal format of FIG. 1, and when receiving the ready-for-data signal 17, connects the terminal equipment 28 to the exchange 6; furthermore, the call control circuit 27 transmits and receives signals for the one-to-one communication.

Next, a description will be given of the circuits 25 and 26 which transmit and receive a control signal using a SYN character as the synchronize signal 1. The control signal, if marked off by steps of eight bits by "|", is represented by SYN|SYN|00000010|$0\alpha_1\alpha_2\ldots\alpha_7$|$0\alpha_8\alpha_9\ldots\alpha_{14}$|$\ldots$|$0\alpha_{n-2}\alpha_{n-1}\alpha_n 0000$|+.
SYN=00010110 is a synchronize character indicating the synchronize signal 1 and 00000010 following the synchronize character is the function determination information 2, which indicates the selection signal in the multi-address calling, as seen from FIG. 2. +=10101011 is an end character indicating the end signal 4 and $0\alpha_k\alpha_{k+1}\ldots\alpha_{k+6}$ is a terminal bit appointing pattern of the terminal appointing information 3. The bit $\alpha_i$ of the terminal $T_i$ desired to be called for the multi-address delivering is set to "1". The reason for which "0" is inserted in the bit appointing pattern every eight bits is to avoid confusion with the end character +. Flour "0s" after the last bit $\alpha_n$ in the bit appointing pattern are dummy bits for dividing the control signal by steps of eight bits.

Figure 7:
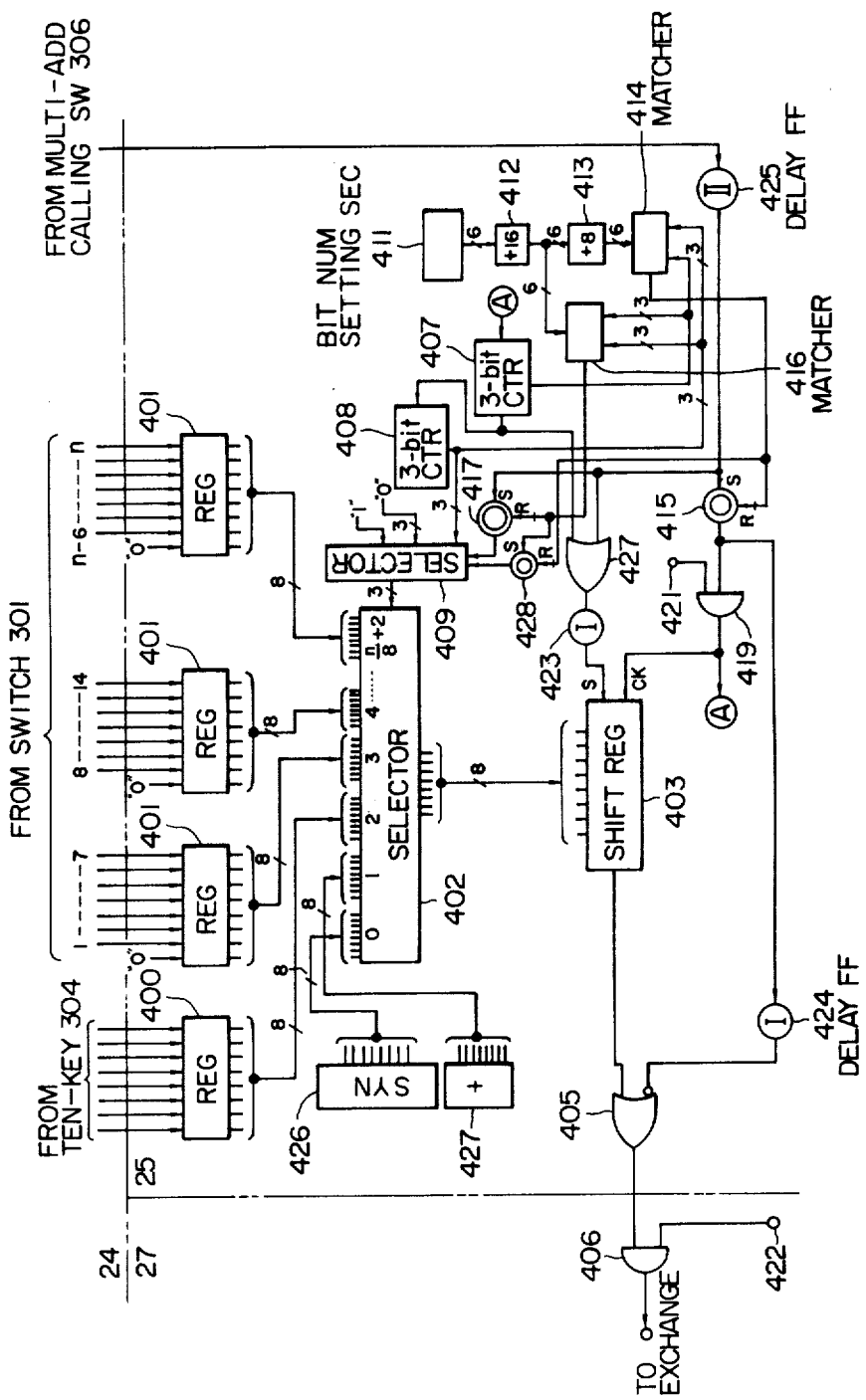
FIG. 7 is a block diagram illustrating a specific example of a transmitting circuit 25 in FIG. 6.
Figure 8:
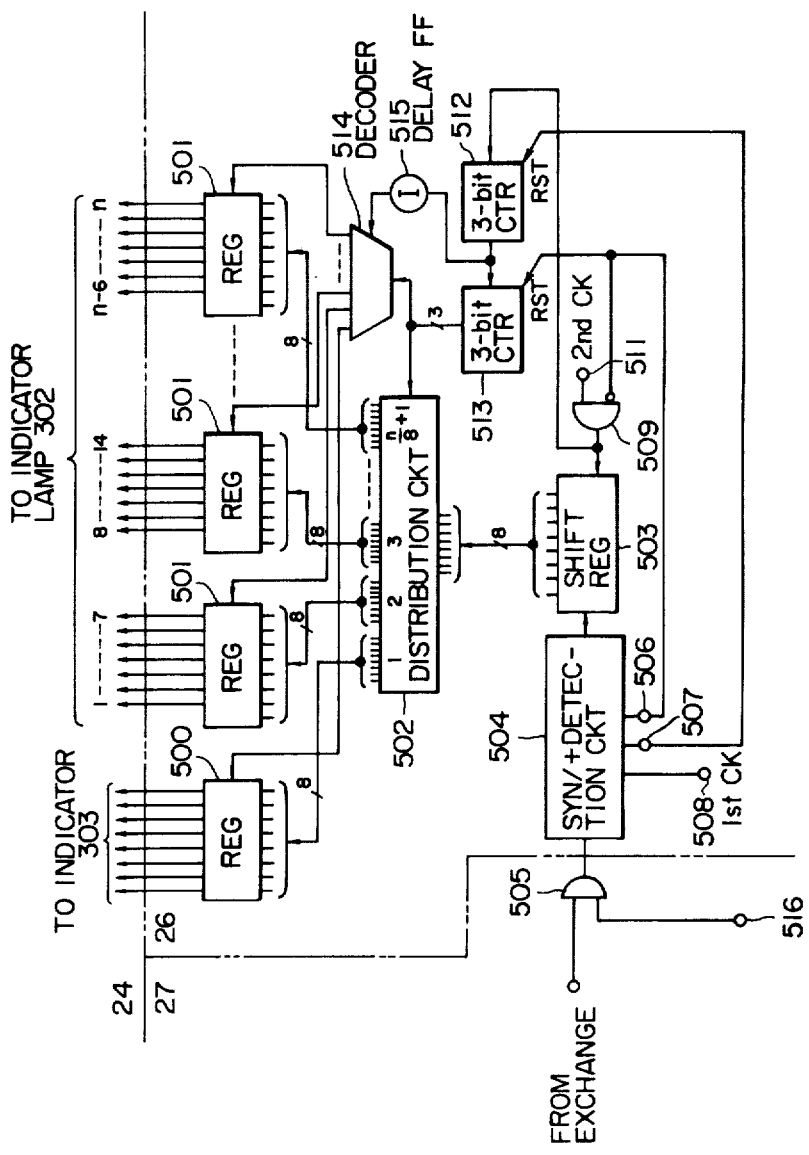
FIG. 8 is a block diagram illustrating a specific example of a receiving circuit 26 in FIG. 6.

FIGS. 7 and 8 illustrate specific circuit arrangements of the transmitting circuit 25 and the receiving circuit 26 employed in FIG. 6. In FIG. 7, any one of a hold register 400 for holding the code of the function determination information 2 entered from the ten-key 304, a plurality of eight-bit hold registers 401 for holding the ON/OFF state of the push-button switches 301, a synchronous code setting section 426 having set therein the SYN code, and an end code setting section 427 having set therein the +code of the end signal, is selected by a selector 402 and the content (eight bits) of the selected register or setting section is provided to a shift register 403, from which the eight bits are sequentially outputted bit by bit. The leading bit of each hold register 401 is fixedly set to "0". The output from the shift register 403 is applied to the exchange 6 via an OR circuit 405 and an AND circuit 406.

Three-bit, eight-step counters 407 and 408 are cascaded and a selector 409 is controlled by the output from flip-flops 417 and 428; when the outputs from the flip-flops 417 and 428 are "0""0", "1""0" and "0""1", the selector 409 selects "0", the output from the counter 408 and "1" and applies them as control signals to the selector 402. The number of bits in the terminal determination field 3 is set in a transmission bit number setting section 411 and the set number is added with "16" in an adder 412 and the added value is further added with "8" in an adder 413. The number set in the transmission bit number setting section 411 can be modified by changing a jumper or by means of a switch. A matcher 414 compares the added output from the adder 413 with a combined value of the count contents of the counters 407 and 408 and resets by its coincidence output flip-flops 415 and 428. A matcher 416 compares the added output from the adder 412 with the combined value of the count contents of the counters 407 and 408 and, in the case of coincidence, it resets the flip-flop 417 and sets the flip-flop 428. The flip-flops 415 and 417 are set by a signal representing the depression of the push-button switch 306 for indicating the transmission of multi-address communication data. By the set output from the flip-flop 415 is opened a gate circuit 419, through which a second clock at a terminal 421 is supplied to the shift register 403 and the counter 407. A ready-for-data signal is provided via a terminal 422 to the AND circuit 406. Delay flip-flops 423 and 424 are provided which operate on a first clock. The first and second clocks are out-of-phase and used to prevent an erroneous operation resulting from a delay in the circuit and to match the timing of its operation.

A signal indicating the depression of the push-button switch 306 for the multi-address communication is delayed by a delay flip-flop 425 which is set by the fall of the second clock, and the delayed signal and the overflow output from the counter 407 are applied to the shift register 403 via an OR circuit 427 and the delay flip-flop 423, setting the output from the selector 402 in the shift register 423. The reason for which the output from the flip-flop 415 is applied in an inverted form to the OR circuit 405 via the delay flip-flop 424 is to supply a high level for preventing the circuit from being disconnected from the exchange upon completion of sending out of the selection signal while the ready-for-data signal being applied the terminal 422 to keeps it high-level. The initial value of the counter 408 is set to "1".

The signals entered by the ten-key keyboard 304 and the push-button switches 301 are respectively held by the hold registers 400 and 401. Upon turning ON the push-button switch 306 for the multi-address communication, the flip-flop 415 for starting the transmission is set to provide the second clock from the terminal 421 to the shift register 403 and the counter 407 via the gate circuit 419, starting the transmission. Before the flip-flop 415 is set, the outputs from the flip-flops 417 and 428 are both "0" to select "0" in the selector 409, so that the selector 402 selects the SYN code of the setting circuit 426. Immediately before setting of the flip-flop 415, the SYN code is applied to the shift register 403 first and then when the flip-flops 415 and 417 are set, the content of the shift register 403 is transmitted bit by bit to the exchange via the circuits 405 and 406 in accordance with the second clock. After this transmission has been effected for eight bits, the counter 407 overflows and, by the overflow signal, the counter 408 is incremented by "1"; namely, since initial value of the counter 408 is "1", its content becomes "2". At this time, since the flip-flop 417 is set together with the flip-flop 415, the selector 409 selects the output from the counter 408. Accordingly, the hold register 400 is selected by the selector 402. The abovesaid overflow signal from the counter 407 is provided to the shift register 403 via the OR gate 427 and delay circuit 423 and, by this overflow signal, the content of the register 400 selected by the selector 402, that is, the function determination information 2 is set in the shift register 403. In a similar manner, the hold registers 401 are sequentially selected and their contents are transmitted one after another.

Values obtained by adding "16" and "24" to the content of the transmission bit number setting section 411, that is, the bit number of the terminal appointing information 3, are respectively compared with the combined value of the counters 407 and 408 by the matches 416 and 414 at all times and,, in the case of coincidence, the matches 416 and 417 each yield a coincidence signal. By the coincidence with the value added with "16", the flip-flop 417 is reset and the flip-flop 428 is set, in consequence of which the selector 409 selects "1" and the selector 402 selects the + code. When eight bits of this + code are transmitted, the matcher 414 provides a coincidence signal, by which the flip-flops 415 and 428 are reset, putting an end to the transmission. During the transmission, "1" is provided by the call control circuit 25 to the terminal 422.

FIG. 8 illustrates an example of the receiving circuit 26 used in FIG. 6. The function determination information 2 and the terminal appointing information 3 received from the exchange 6 are respectively held in a hold register 500 and a plurality of eight-bit hold registers 501. Any one of the hold registers 500 and 501 is selected by a distribution circuit 502 and the content of the shift register 503 is applied to the selected hold register. Bit information which is provided bit by bit from a synchronization and end detection circuit 504 to the shift register 503 is constructed by the shift register 503 into an eight-bit train. The synchronization and end detection circuit 504 operates on a first clock supplied from a terminal 508 and detects from the control signal from the exchange 6 the synchronize signal 1 and the end signal 4 which are respectively the SYN code and the + code. When detecting the SYN code, the circuit 504 produces a low level "0" at a terminal 506 which is normally at a high level "1", and the low level is kept until the circuit 504 detects the + code which causes to produce a high level "1" at the terminal 506. A terminal 507 is normally at a low level "0" and in the case where the terminal 506 becomes low-level "0" and thereafter the SYN code is detected, the high level "1" is provided at the terminal 507 and when information other than the SYN code is inputted, the terminal 507 returns to the low level "0". The output at the terminal 506 is applied as an inhibit signal to an inhibit gate 509. When the terminal 506 becomes low-level "0", a second clock is supplied via the gate 509 to the shift register 503 and a three-bit counter 512. The three-bit counter 512 has cascade-connected thereto another three-bit counter 513. The counters 512 and 513 are respectively reset by the high level "1" outputs at the terminals 507 and 506. The count content of the counter 513 is decoded by a decoder 514. By the output from the decoder 514 any one of the registers 500 and 501 is selected. The content of the counter 513 is applied as a control signal to the distribution circuit 502. A delay flip-flop 515 which operates on the first clock is provided between the output side of the counter 512 and an enable terminal of the decoder 514. A gate 505 is opened by a multi-address communication data receivable signal, i.e. a proceed-to-select signal from a terminal 516.

During reception, "1" is applied by the call control circuit 27 to the terminal 516. When the synchronization and end detection circuit 504 detects the SYN code in the control signal applied thereto from the exchange 6 via the gate 505, the gate 509 is opened to permit the application of the signal from the exchange 6 to the shift register 503 via the detection circuit 504. The shift register 503 shifts the input signal bit by bit following a clock, thereby to construct an eight-bit train. Upon reception of the eight bits, the counter 512 overflows and, by the overflow signal, the content of the shift register 503 is applied to any one of the hold registers 500 and 501. The hold registers 500 and 501 are selected as a result of control of the distribution circuit 502 by the output from the counter 513. That is, first eight bits are set in the hold register 500. The counter 513 is added with "1" by the overflow signal of the counter 512, so that, upon each reception of eight bits, the hold registers 500 and 501 are sequentially selected to set therein the received signal. When the synchronization and end detection circuit 504 detects the + code, it derives the high level "1" at the terminal 506 to close the gate 509, stopping the reception.

The function determination information 2 held in the hold register 500 is displayed on the display 303 and seven bits of each eight-bit train of the hold register 501 except one bit at one end thereof, that is, except "0" fixedly set in the control signal for avoiding confusion with the + code, are respectively indicated by the corresponding ones of the destination terminal indicator lamps 302. Although in this embodiment the indicator lamps 302 on the control panel 24 are described to have one-to-one correspondence to the destination terminals, it is also possible to provide a plurality of indicator lamps for each destination terminal and to selectively light them in accordance with the function determination information 2 received from the exchange 6. Furthermore, it is also possible to realize partially or totally the transmitting circuit 25, the receiving circuit 26 and the call control circuit 27 by program control using a microprocessor or the like.

Next, a description will be given of the signal control equipment utilized in the exchange 6. When having received the control signal of the format of FIG. 1 sent out from the originating terminal, the exchange 6 obtains from a transformation table destination terminal addresses corresponding to "1" in the bit appointing pattern of the terminal appointing information 3 of the control signal. That is, the exchange 6 has, for each originating terminal j, such a bit position-destination terminal address transformation table as shown in FIG. 9 which is composed of bit appointing storage areas $\beta_1$ to $\beta_n$ for storing the values $a_1$ to $a_n$ of the respective bits of the terminal appointing information 3 and storage areas having stored therein destination terminal addresses $DA_1$ to $DA_n$ in a corresponding relation to the bit appointing storage areas $\beta_1$ to $\beta_n$. The destination terminal addresses $DA_1$ to $DA_n$ are prestored by the originating terminals in the abovesaid table, for example, in the same manner as for the operation of registering an abbreviated dial.

Figure 10:
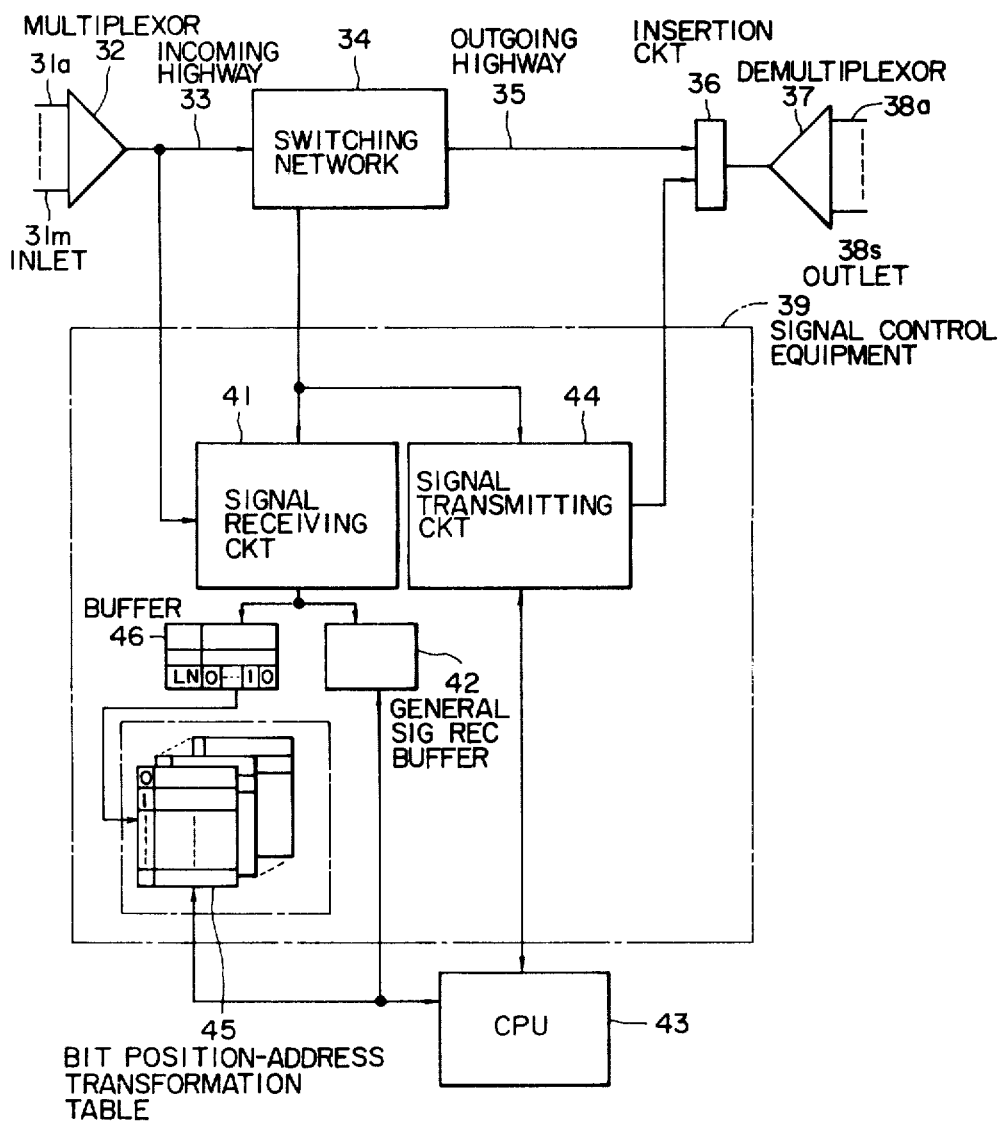
FIG. 10 is a block diagram illustrating the construction of a multi-address calling signal control equipment on the side of an exchange.

FIG. 10 illustrates an embodiment of the signal control equipment for the multi-address calling on the side of the exchange. Inlets 31a to 31m, to which originating terminals are respectively connected, are connected to a multiplexor 32, which is connected to an incoming highway 33. A time-divided multiplex signal provided on the incoming highway 33 from the multiplexor 32 is applied to a switching network 34, for example, a time switch of one stage, wherein one time slot in the incoming highway 33 is replaced with one or more time slots of an outgoing highway 35, and a time-divided multiplex signal thus provided on the outgoing highway 35 is provided via an insertion circuit 36 to a demultiplexor 37. In the demultiplexor 37, the time-divided multiplex signal is demultiplexed into outlets 38a to 38s to which the destination terminals are connected.

The signal on the incoming highway 33 is branched to a signal receiving circuit 41. From the switching network 34 a line number LMN (for example, line memory number) indicating the channel of the signal inputted from the incoming highway 33 is supplied to the signal receiving circuit 41, wherein the control signal is separated for each channel and stored in a general signal receiving buffer 42. The buffer 42 is read out by a central processing unit 43 to perform various control operations in accordance with the control signal. The central processing unit 43 yields various control signals, too, and applies them to a signal transmitting circuit 44, wherein the control signals are each assembled to form an 8-bit envelope and supplied to the insertion circuit 36 in the corresponding channel from the switching network 34. This is the same as the operation in the exchange of the conventional multi-address communication system of this kind.

In the signal control equipment 39 are provided bit position-destination terminal address transformation tables 45. As referred to previously in connection with FIG. 9, the transformation tables 45 are provided for each originating terminal j and have the storage areas $\beta_1$ to $\beta_n$ for storing bits indicating the presence or absence of connection request of respective destination terminals and the storage areas for storing the destination terminal addresses $DA_1$ to $DA_n$. In order that the bit pattern $a_1$ to $a_n$ in the control signal from the originating terminal may be stored in the storage areas $\beta_1$ to $\beta_n$ of the transformation table 45, the signal receiving circuit 41 sets the line number LMN of the originating terminal and the bit pattern in a bit pattern receiving buffer 46.

Figure 11:
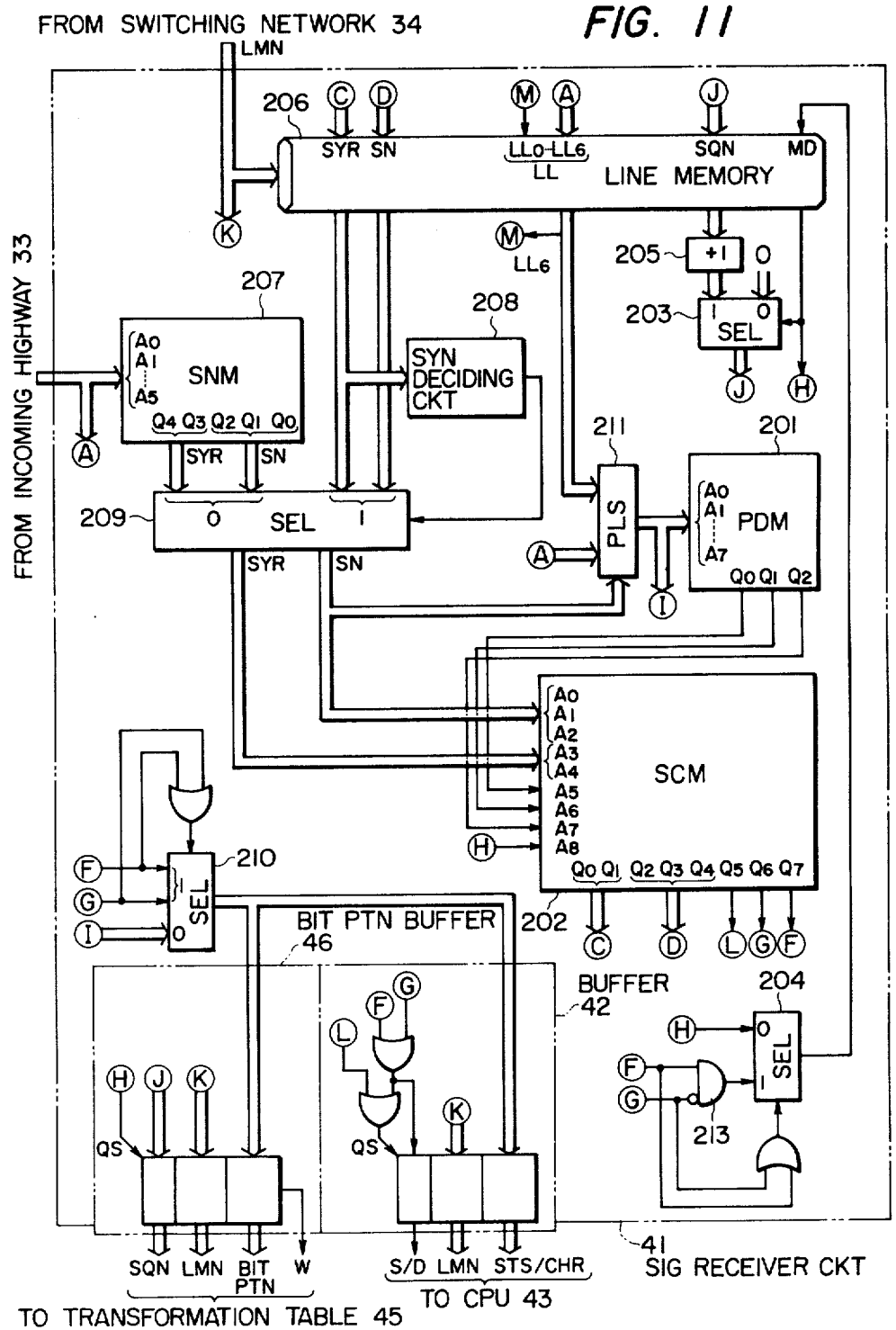
FIG. 11 is a block diagram illustrating a specific example of a receiving circuit 41 in FIG. 10.

A description will be given, with reference to FIG. 11, of a specific example of the signal receiving circuit 41 in connection with the case of employing a synchronous transmission system which uses the SYN character. The signal receiving circuit 41 is identical in its basic construction with a known synchronize signal receiving circuit. As a result of a calculation corresponding to each line, control information is held in a receiving line memory 206, specified by the line number LMN from the switching network 34 (FIG. 10). The following description will be given mainly of one channel. A synchronize character position detection circuit 207 for detecting the synchronize character SYN in the control signal from the incoming highway 33 (FIG. 10), a synchronous state deciding circuit 208 and a parallel shifter 211 are provided in the same manner as in the prior art. That is, in the terminal, as described previously with regard to FIGS. 7 and 8, the data bits are processed by steps of eight bits but they are transmitted in the form of a six-bit signal and, in each channel of the highways 33 and 35 in the exchange 6, the data bits take the form of six-bit signal. Accordingly, the six-bit signal is converted by the parallel shifter 211 to the original eight-bit form prior to the processing of the control signal.

In order to distinguish the signal for multi-address communication and to form a sequence number SQN of the bit pattern for one originating terminal, a pattern detection circuit 201 connected to the parallel shifter 211, a part of a shift number counting circuit 202, selectors 203 and 204 and an adder 205 are newly added.

Figure 14:
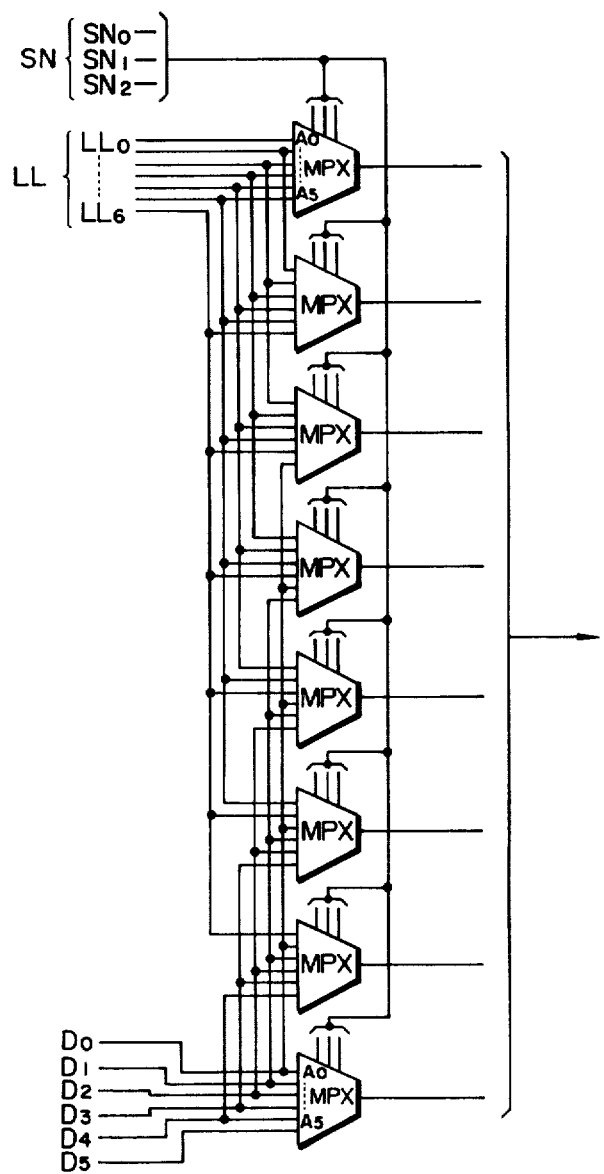
FIG. 14 is a diagram showing a specific example of the construction of the parallel shifter 211.

When the control signal is applied to the exchange 6, the position of the synchronize character SYN is detected by the synchronize character position detection circuit 207 in the signal receiving circuit 41 following a known procedure and eight bits are sequentially assembled into a signal in accordance with the position detected information. In the case of the non-synchronous state, a status signal SYR detected from the line memory 206 is "0" and the selector 209 is controlled by the output from the synchronous state deciding circuit 208 to select the output from the synchronize character position detection circuit 207. The synchronize character position detection circuit 207 is arranged as a read only memory, which is supplied at its inputs $A_0$ to $A_5$ with six-bit data $D_0$ to $D_5$ from the incoming highway 33 to provide outputs $Q_0$ to $Q_2$ indicating a shift number SN and outputs $Q_3$ and $Q_4$ indicating the status signal SYR. Its input/output logic is such as depicted in FIG. 12. By the shift number SN in the output from the selector 209, the parallel shifter 211 is controlled to receive a current pattern $D_0$ to $D_5$ from the incoming highway 33 and a detected last look patter LL ($LL_0$ to $LL_6$) from the line memory 206 and to output any one of trains of eight successive ones of 13 bits $LL_0$ to $LL_6$ and $D_0$ to $D_5$ in accordance with the shift number SN, as depicted in FIG. 13. The bit $LL_6$ of the last look pattern LL is written as the bit $LL_0$ of the next last look pattern in the line memory 206 and the last look pattern has seven bits. For example, as depicted in FIG. 14, the parallel shifter 211 has eight multiplexors MPX to which are distributed the bits $D_0$ to $D_5$ and $LL_0$ to $LL_6$. The multiplexors MPX are each controlled by the shift number SN to output one of such inputs, providing an eight-bit output as the output from the parallel shifter 211.

Figures 15, 16, 19:
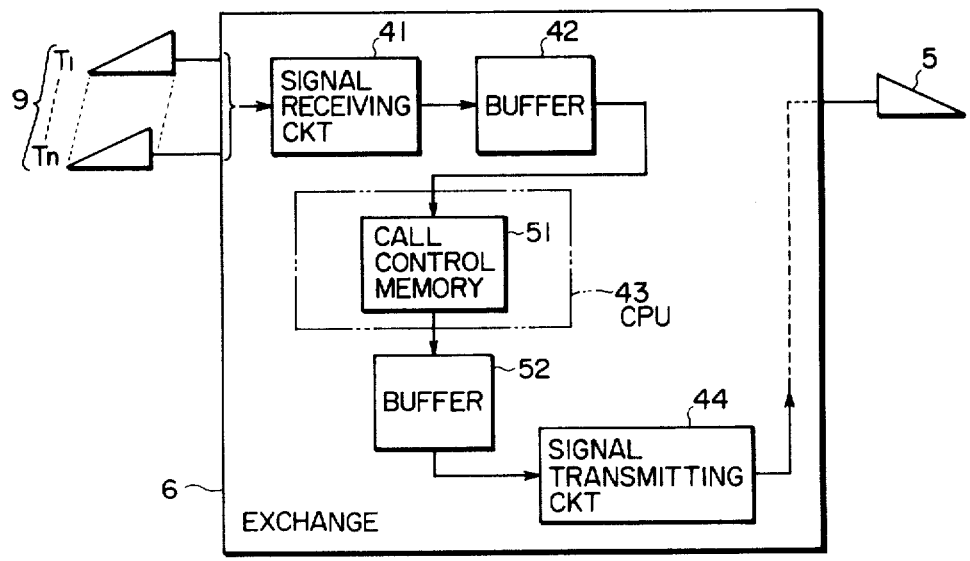
FIG. 15 is a diagram showing the input/output logic of a pattern detection circuit 201 in FIG. 11.
FIG. 16 is a diagram showing the input/output logic of a shift number counting circuit 202 in FIG. 11.
FIG. 19 is a diagram explanatory of the formation of a control signal in the exchange.

The eight-bit output thus obtained is supplied to the pattern detection circuit 201. The pattern detection circuit 201 is formed as a memory, for example, and produces an output only when accessed by a specified pattern. The input/output logic of this memory is shown in FIG. 15, in which one of outputs $Q_0$, $Q_1$ and $Q_2$ becomes "1" in response to the synchronize pattern SYN, the end pattern +, the multi-address communication selection pattern and the path connecting request signal pattern. Accordingly, when the eight-bit pattern produced by the parallel shifter 211 is the synchronize pattern, outputs $Q_0$, $Q_1$ and $Q_2$ of the detection circuit 201 are "1", "0" and "0", which are provided to the shift number counting circuit 202.

The shift number counting circuit 202 is also formed as a read only memory and accessed by the detection circuit 201, the selector 209 and a signal MD of the line memory 206 to yield an output following the input/output logic shown in FIG. 16. In FIG. 16, asterisks * indicate what is called "dont't care", and they may be either "1" or "0". Accordingly, when the synchronize pattern is detected by the pattern detection circuit 201, outputs $Q_0$ and $Q_1$ of the shift number counting circuit 202 both become "1", which is written as the status signal SYR in the line memory 206. Consequently, in the subsequent input applications the selector 209 is controlled by the output from the synchronous state decision circuit 208 to select the status signal SYR and the shift number SN read out from the line memory 206. Since the shift number counting circuit 202 always adds "2" to the abovesaid shift number, the parallel shifter 211 produces the eight-bit output shown in FIG. 13.

Figure 17:
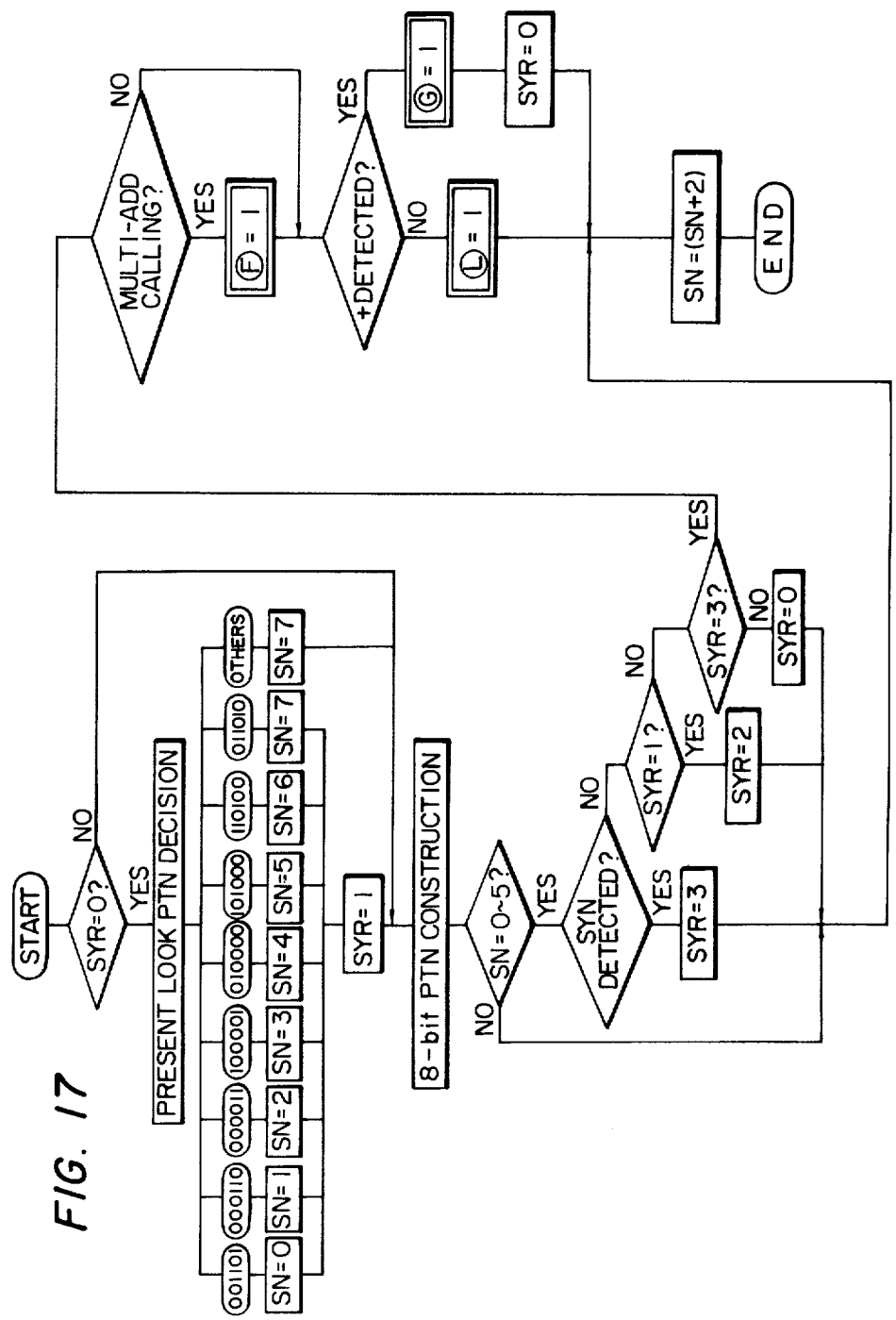
FIG. 17 is a flowchart illustrating the operative state of the receiving circuit of FIG. 11.

The signal receiving circuit 41 performs an operation shown in FIG. 17 upon each input application. The operation starts with checking of the status signal SYR and when it is non-synchronous, the output from the synchronous state decision circuit 208 is "0". At this time, the pattern of data $D_0$ to $D_5$ (present look) inputted from the incoming highway 33 is decided and, in accordance with the pattern, the shift number SN is set to any one of "0" to "7". In the case of the synchronize pattern, the status signal SYR is set to "1" and then the parallel shifter 211 produces the eight-bit output. When the shift number is any one of "0" to "5", the eight-bit output is checked to determine whether it is the synchronize pattern SYN or not. When it is the synchronize pattern SYN, the status signal SYR is set to "3" and when it is not the synchronize pattern, the status signal SYR is checked as to whether it is "1" or "3". If the status signal SYR is "1", it is set to "2" and if it is neither "1" nor "3", it is set to "0" and then the shift number SN is added with "2", putting an end to the operation. The status signal SYR is checked to determine whether it is "3" or not and, in the case of coincidence, it is checked whether the input is the multi-address delivering (whether the output Q of the pattern detection circuit 201 is "1" or not). In the case of the multi-address delivering, the output $Q_7$ of the shift number counting circuit 202 is set to "1" and then the + code is detected. In the case where the + code is not detected, the output $Q_6$ of the shift number counting circuit 202 is set to "0" and a character reception is performed and then the shift number is added with "2", putting an end to the operation. When the + code is detected, the output $Q_6$ of the shift number counting circuit 202 is added with "1" and the status signal SYR is set to "0", after which the shift number SN is added with "2", then putting an end to the operation.

In the manner described above, the eight-bit output is produced. The eight-bit output provided immediately after the detection of the synchronize character SYN is the function determination information 2, as shown in FIG. 1. In FIG. 11, when the selection signal of the multi-address delivering is detected by the pattern detection circuit 201, its output $Q_2$ becomes "1", as depicted in FIG. 15, and it is applied to the shift number counting circuit 202 and its output $Q_7$ becomes "1" as shown in FIG. 16. By the output $Q_7$ the selector 204 is selected at the side of "1" to provide "1" which is the output from an AND gate 213, by which information MD indicating the multi-address selection information (=1) is set in the line memory 206. Further, the output $Q_7$ of the shift number counting circuit 202 (F=1) is provided via the buffer 42 to the central processing unit 43. The eight-bit information which is produced thereafter is the terminal appointing information 3 and the information MD is held at "1" until the end code + is deected. That is, the control signal of the selector 204 is "0" and its "0" side, that is, the MD read output "1" of the line memory 206 is selected, so that the information MD is maintained at "1". By the operations of the line memory 206, the +1 adder 205 and the selector 203, the sequence number SQN is sequentially stepped one by one from "1" and, upon each formation of the eight-bit train of the terminal appointing information 3, the sequence number SQN is allotted to the eight-bit pattern and this sequence number SQN and the line number LMN=1 of the originating terminal 5 are loaded in the bit pattern receiving buffer 46. At this time, a bit pattern BITPTN of eight bits is also written in the bit pattern receiving buffer 46 via the parallel shifter 211 and the selector 210. When the end code + is similarly detected by the pattern detection circuit 201, its output $Q_1$ becomes "1", as depicted in FIG. 15, in consequence of which the output $Q_6$ of the shift number counting circuit 202 becomes "1" (G=1), as shown in FIG. 16, and the output "0" from the gate 213 is selected by the selector 204, causing the multi-address delivering selection information MD to become "0". As a result of this, the addition of the sequence number SQN is stopped (0 cleared) and the loading of the bit pattern in the buffer 46 is also stopped. The buffers 42 and 46 permit the loading only when their QS inputs are "1". The end code + detected information G=1 is provided via the buffer 42 to the central processing unit 43.

Figure 18:
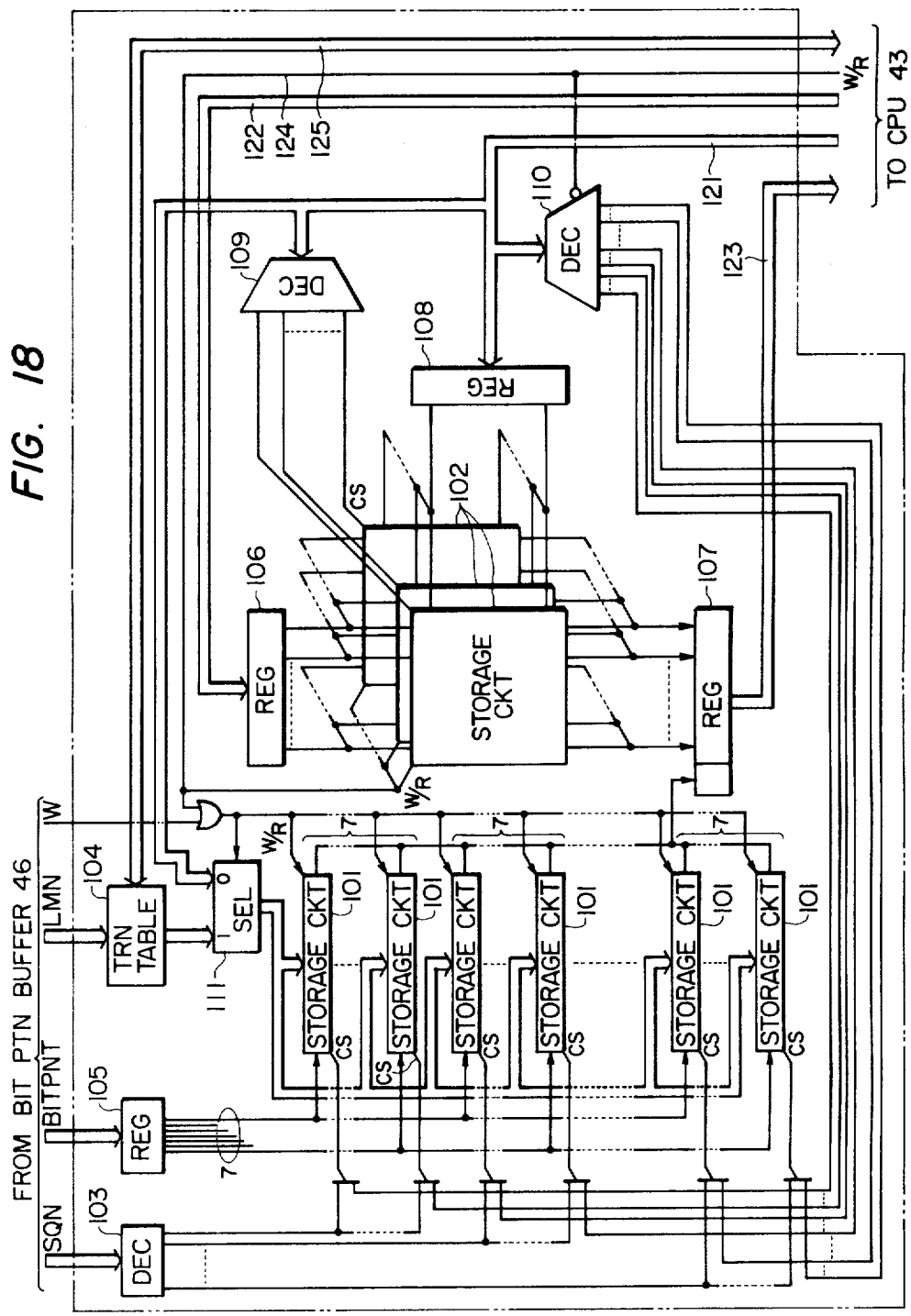
FIG. 18 is a diagram showing specific examples of the address transformation table of FIG. 10 and its peripheral circuits.

The data loaded in the buffer 46 are sequentially set in the bit appointing storage areas $\beta_1$ to $\beta_n$ (FIG. 9) of the transformation table 45. The bit position-destination terminal address transformation table 45 and its peripheral circuits are constructed, for example, as shown in FIG. 18. The bit appointing storage area $\beta_i$ is provided in a storage circuit 101 and the destination terminal address $DA_i$ is stored in a storage circuit 102. An address for the storage circuit 102 is provided via a line 121 to a register 108 from the central processing unit 43 and data to be written in the storage circuit 102 is provided via a line 122 to a register 106, whereas data read out from the storage circuit 102 is provided via a line 123 to the central processing unit 43 from a register 107. The read/write control of the storage circuits 101 and 102 is performed by the central processing unit 43 via a line 124. A portion of the address on the line 121 is applied to decoders 109 and 110 and, by their decoded outputs, chips of the storage circuits 102 and 101 are selected. In this case, however, during write operation of the storage circuit 102 the output from the decoder 110 is inhibited and only the readout operations of the storage circuits 101 and 102 are concurrently carried out.

The sequence number SQN from the bit pattern receiving buffer 46 is decoded by a decoder 103 and, by its decoded output, chips of the storage circuits 101 are selected; namely, seven chips of the storage circuits 101 are selected one after another. The seven bits of the bit pattern BITPTN from the buffer 46 are each inputted to one of the seven selected chips of the storage circuits 11 via a register 105. The line number LMN from the buffer 46 is transformed by a table 104 into an address of one of the storage circuits 101. For example, if the line number of $T_0$ in the originating terminal 5 is 1, then 1 is transformed into "0". By the output from the table 104, an address to each chip of the storage circuit 101 is provided for each originating terminal. The transformation table data for the table 104 are provided via the line 125 from the central processing unit 43. When the bit pattern receiving buffer 46 is read out, if the sequence number SQN is "1" or more, a signal W becomes "1" and, in a selector 111 which is supplied with the output from the table 104 and the address from the central processing unit 43, the former is selected by the signal "1".

Words of the storage circuits 101 respectively correspond to table numbers of the transformation table 45 and the number of the storage circuits 101 corresponds to the number of destination terminals being registered. Accordingly, it is sufficient to employ, as each of the storage circuits 101, for example, a (1 bit×N words) memory chip the word number N of which is larger than the number of accommodated originating terminals. The number of such chips is selected to be a number M (a multiple of 7 in this embodiment) which is larger than the number of destination terminals registered for the multi-address communication. The storage circuit 102 corresponds in the word and bit directions to the transformation table 45 and, letting the bit length of the destination terminal address be represented by K, a memory of K bit×M words is used as the storage circuit 102. This can also be formed by a combination of (1 bit×M words) memory chips.

The storage circuits 101 form groups by steps of seven and each group operates on the same chip select signal. Each group of the storage circuits 101 corresponds to each bit pattern $0\alpha_k\alpha_{k+1}\ldots\alpha_{k+6}$ which is loaded in the buffer 46. Further, the address to each storage circuit 101 corresponds to the table number j of the transformation table 45. When the sequence number SQN of the data from the buffer 46 is "1", the chip select signal to a first group of the storage circuits 101 is outputted from the decoder 103. Simultaneously with this, a table number "0" of the transformation table 45 is provided as an address input to the storage circuits 101 from the transformation table 104 by the line number LMN=1 of the originating terminal $T_0$. By the operation described above the bits of the bit pattern $0\alpha_1\alpha_2\ldots\alpha_7$ are written in addresses 0 of the (seven) storage circuits 101 of the first group excepting the leading bit "0". This means that $\alpha_1$ to $\alpha_7$ are respectively set in the bit appointing storage areas $\beta_1$ to $\beta_7$ of the transformation table shown in FIG. 9.

Thereafter, data $0\alpha_8\alpha_9\ldots\alpha_{14}$, $0\alpha_{15}\alpha_{16}\ldots\alpha_{21},\ldots,$ $0\alpha_{n-2}\alpha_{n-1}\alpha_n 0000$ are respectively written in 0 addresses of the storage circuits 101 of second, third, ... (n+4/7)th groups in the same manner as described above. In this way, the bit pattern $\alpha_1$ to $\alpha_n$ is set in the bit appointing storage areas $\beta_1$ to $\beta_n$ in the transformation table 45.

After detecting the end code +, the central processing unit 43 sequentially reads out the transformation table 45 from the 0 address to detect i which is $\beta_i=1$, whereby the central processing unit 43 can detect a request for connecting the multi-address calling to the terminal $T_i$. Further, the address of the terminal $T_i$ can also be obtained as $DA_i$ read out at the same time.

The function of a control signal from a terminal, other than the multi-address communication selection signal, for example, the path connecting request signal (see FIG. 2), is also similarly detected by the signal receiving circuit 41. The detected function is communicated to the central processing unit 43 and, at the same time, it is set in the transformation table corresponding to the destination terminals, by which it is possible to easily appoint the destination terminal to which the multi-address communication path is to be connected.

The control signal is formed by the central processing unit 43 and set in the signal transmitting circuit 44 similar in construction as in the prior art and transmitted therefrom to the originating terminal; however, the amount of signal set in the signal transmitting circuit 44 is very small as compared with the amount of signal in the case of sending out a signal for each destination terminal.

A brief description will be given, with reference to FIG. 19, of the formation of the control signal on the side of the exchange 6. For example, the call accept signals from the destination terminals 9 ($T_1$ to $T_n$) are received by the signal receiving circuit 41 in the exchange 6, wherein they are processed by the same method as in the prior art, thereafter being provided via the general signal receiving buffer 42 to the central processing unit 43. In the central processing unit 43, the call accept signals received from the destination terminals are respectively stored at bit positions predetermined corresponding thereto in a call control memory 51 provided corresponding to the originating terminal, and the terminal appointing information 3 of the control signal format depicted in FIG. 1 is edited. After setting the call accept signal from each destination terminal in the call control memory 51, the central processor unit 43 stores in a transmitting buffer 52 the terminal determination information indicating the call accepting state indication signal 00000011 and then transfers to the transmitting buffer 52 the terminal appointing information indicating the call accepting state which is set in the call control memory 51. Next, when the signal transmitting circuit 44 is started to send out data, it sequentially sends out the data from the transmitting buffer to the corresponding line. In this case, the synchronize signal 1 and the end signal 4 are added to the signal to be sent out. The data receiving state indication signal and other control signals which are sent out from the exchange 6 are also formed in the same manner as described above.

While in the foregoing the present invention has been described in connection with the character synchronous transmission system using the SYN character, it is a matter of course that the invention is equally applicable to a frame transmission system in which the frame synchronization is effected through utilization of a flag. In this case, the control signal takes the form of F00000010$\alpha_1\alpha_2 \ldots \alpha_n$F, where F=01111110 is a flag, 00000010 is the function determination code (the multi-address delivering selection signal) and $\alpha_1\alpha_2 \ldots \alpha_n$ are the terminal appointing bits. In order to avoid confusion between the terminal appointing bits $\alpha_1$ to $\alpha_n$ and the flag F, what is called a "0" inserting operation is performed by the signal transmitting circuit for inserting "0" after five successive "1s" in the terminal appointing bits and what is called a "0" removing operation for removing the inserted "0" is also performed by the signal transmitting circuit, as in an ordinary flag synchronization system. For instance, if a known frame signal receiving circuit for the flag detection and the "0" elimination and a known frame signal transmitting circuit for the "0" insertion are provided in place of the signal receiving circuit 41 and the signal transmitting signal 44 in FIG. 10, then it is possible to construct a signalling equipment for multi-address calling in the case of the frame transmission system, with the arrangement of the transformation table 45 remaining unchanged. In this case, there is no need of dividing the storage circuits 101 into groups by step of seven as in the embodiment of the character synchronization system; they can easily be divided into groups, each consisting of a desired number of storage circuits.

As has been described in the foregoing, according to the present invention, a variety of control information which are required between an originating terminal and an exchange for multi-address calling, such as the selection signal, the call accepting state indication signal and so forth, can be transmitted and received as one signal of a simple and uniform signal format between the originating terminal and the exchange regardless of the number of destination terminals; therefore, it is possible to reduce the time for setting a call of multi-address communication. Further, according to the present invention, since the path connecting request by the originating terminal, the indication of the data receiving state of the destination terminal and clear confirmation which have heretofore been impossible can easily be effected by similar control signals, the contents of the multi-address calling can be improved. Moreover, since setting of information such as the selection signal and so forth in terminals becomes less troublesome, the man-machine interface can be simplified. That is, by transmitting and receiving signals for the multi-address calling between the exchange and the originating terminal through the use of the control panel depicted in FIG. 5 and the control signal of the format shown in FIG. 1, the operation of the control panel is made easy; namely, desired destination terminals can be appointed by a simple operation of one-touch buttons and the appointing information is sequentially transmitted without being encoded, so that the transmitting circuit can be simplified. Furthermore, the received control signal need not be decoded and the terminal appointing bits are respectively allotted to corresponding display elements; accordingly, it is sufficient to sequentially distribute the terminal appointing information and the receiving circuit can also be made very simple in construction, offering an inexpensive control equipment. In addition, since each destination terminal can be appointed by a one-bit signal, there are such advantages that the signal length is reduced, that processing by the exchange is alleviated and that the state of the destination terminal and a signal therefrom can be communicated to the originating terminal from the exchange.

Besides, in the control equipment on the side of the exchange, destination terminal address table is provided for each originating terminal, by which dial information of each destination terminal can be obtained directly from the terminal appointing information of the control signal; this permits simplification of the signal receiving process and a sufficient reduction of the processing time. As shown in FIG. 18, the write in the storage circuits 101 is achieved by forming a plurality of bits corresponding to the sequence number SQN into one group, applying to a plurality of chips the address corresponding to the line number LMN and selecting the plurality of chips by the sequence number SQN to write bit by bit in the chips in parallel relation. Accordingly, during writing of each group of the terminal determination information of the control signal, the address to the storage circuits 101 need not be changed, and hence the write operation is also simple.

Moreover, since the path connection is performed using the destination terminal address stored in the exchange, the path connection setting is achieved via the switching network (the time switch 34 in FIG. 10) of the exchange as in the one-to-one communication. Accordingly, it is possible to effect multi-address communication not only to desired ones of terminals accommodated in the exchange but also to terminals accommodated in another exchange by setting their addresses in the transformation address table 45.

It will be apparent that many modifications and variations may be effected without departing from the scope of the novel concepts of this invention.

We claim:

1. A signalling system for multi-address calling for transmitting the same information from an originating terminal to a plurality of destination terminals, in which a control signal related to the plurality of destination terminals, which is transmitted and received between the originating terminal and an exchange, is composed of:

a synchronize signal for detecting the beginning of the control signal;

a function determination field for indicating that the control signal is any one of at least a selection signal, a call accepting state indication signal, and a data receiving state indication signal; and a terminal appointing field in which respective one bit time slots are assigned to each of the destination terminals in a predetermined order so that the signal set in the function determination field is allotted as a result of one bit appearing in said respective time slot.

2. A signalling system according to claim 1, wherein the control signal further includes an end signal indicating its end and a fixed check bit inserted in the terminal appointing field for avoiding confusion between it and the end signal and having nothing to do with the destination terminals.

3. A signalling system according to claim 2, wherein the synchronize signal is a synchronize character SYN of the character synchronous system; the end signal is a + character; and the check bit is inserted in the terminal appointing field every seven bits.

4. A signal control equipment for multi-address calling which is provided on the side of an originating terminal for transmitting and receiving between the originating terminal and an exchange a control signal composed of a synchronize signal, function determination information indicating the kind of the control signal, and terminal appointing information comprising a terminal appointing field in which respective one bit time slots are assigned to each of a plurality of destination terminals in a predetermined order so that the signal set in the function determination field is allotted as a result of one bit appearing in said respective time slot, the signal control equipment comprising:

a transmitting circuit composed of a synchronize signal setting circuit for generating the synchronize signal, a first function determination information holding circuit for holding the function determination information, a first terminal appointing information holding circuit for holding the terminal appointing information, and a circuit for sequentially sending out, bit by bit, the synchronize signal, the function determination information, and the terminal appointing information;

a receiving circuit composed of a circuit for detecting the synchronize signal transmitted from the exchange, a circuit for sequentially receiving the channel signal transmitted from the exchange on the basis of the detection of the synchronize signal, a second function determination information holding circuit for holding the received function determination information, and a second terminal appointing information holding circuit for holding the received terminal appointing information;

means for setting the function determination information in the first function determination information holding circuit;

terminal appointing means provided to have one-to-one correspondence to the plurality of destination terminals for setting the terminal appointing information in the first terminal appointing information holding circuit;

function determination information display means for displaying the function determination information held in the second function determination information holding circuit; and terminal indicator means provided to have one-to-one correspondence to the plurality of destination terminals for indicating, bit by bit, the terminal appointing information held in the second terminal appointing information holding circuit.

5. A signal control equipment according to claim 4, wherein the terminal appointing information is set by a push-button switch for each destination terminal; and indicator elements of the terminal indicator means, each corresponding to one of the destination terminals, are respectively provided alongside of corresponding ones of the push-button switches.

6. A signal control equipment according to claim 4 or 5, wherein the circuit for sequentially sending out the synchronize signal, the function determination information and the terminal appointing information is composed of a selector for selecting parallel outputs from each of the synchronize signal setting circuit, the first function determination information holding circuit and a plurality of bit groups of the first terminal appointing information holding circuit, a first shift register supplied with the selected parallel outputs from the selector to send them out bit by bit, and means for sequentially switching the selection of the selector upon each completion of the sending-out operation of the first shift register.

7. A signal control equipment according to claim 4, wherein the circuit for sequentially receiving the control signal is composed of a second shift register sequentially supplied with the received control signal to yield parallel outputs upon each reception of a predetermined number of effective bits following the detection of the synchronize signal, a distribution circuit supplied with the parallel outputs from the second shift register to supply them to the second function determination information holding circuit and one of a plurality of bit groups of the second terminal appointing information holding circuit, and means for controlling the distribution circuit to sequentially change the destination of the output from the distribution circuit each time the shift register shifts by a predetermined number of steps.

8. A signal control equipment for multi-address calling which is provided on the side of an exchange for transmitting and receiving, between the exchange and an originating terminal, a control signal composed of a synchronize signal, function determination information indicating the kind of the control signal, and terminal appointing information comprising a terminal appointing field in which respective one bit time slots are assigned to each of a plurality destination terminals in a predetermined order so that the signal set in the function determination field is allotted as a result of one bit appearing in said respective time slot, the signal control equipment comprising:

a transmitting circuit for transmitting the control signal;

a receiving circuit for receiving the control signal;

storage means including an address storage area for storing the addresses of the plurality of destination terminals registered corresponding to the originating terminal and a bit appointing storage area for storing information such as a request for calling each destination terminal;

bit appointment setting means for setting, bit by bit, the terminal appointing information of the control signal received by the receiving circuit in the corresponding one of the bit appointing storage areas of the storage means; and readout means for reading out the storage means concurrently with reading out of the destination terminal address corresponding to the bit of each bit appointing storage area.

9. A signal control equipment according to claim 8 wherein the receiving circuit is provided with a pattern detection circuit supplied with each character constructed by each bit constructing means to detect the synchronize signal, an end signal and a selection signal; means for allotting a sequence number to each character of the terminal appointing information constructed after the pattern detection circuit detects the selection signal of multi-address calling; a bit pattern receiving buffer for storing, upon each construction of each character of the terminal appointing information, the sequence number corresponding to its bit pattern and the corresponding destination terminal number; one-bit-word memories of the same number as the bits of the terminal appointing information, provided as the bit appointing storage areas; and means for accessing all of the one-bit-word memories by the address corresponding to the originating terminal number read out from the bit pattern receiving buffer, selecting a predetermined number of the one-bit-word memories by the sequence number read out from the bit pattern receiving buffer and storing, bit by bit, in the selected one-bit-word memories the bit pattern of the terminal appointing information read out from the bit pattern receiving buffer.

* * * * *